United States Patent
Richstein et al.

(10) Patent No.: US 10,185,556 B2
(45) Date of Patent: Jan. 22, 2019

(54) INTERACTIVE SOFTWARE DEVELOPMENT KIT DOCUMENTATION TOOL

(71) Applicant: SAP SE, Walldorf (DE)

(72) Inventors: Hans-Juergen Richstein, Rauenberg (DE); Marita Kruempelmann, Dielheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/662,820

(22) Filed: Jul. 28, 2017

(65) Prior Publication Data

US 2018/0239601 A1 Aug. 23, 2018

Related U.S. Application Data

(60) Provisional application No. 62/462,065, filed on Feb. 22, 2017.

(51) Int. Cl.
| | |
|---|---|
| *G06F 9/44* | (2018.01) |
| *G06F 8/70* | (2018.01) |
| *G06Q 10/06* | (2012.01) |
| *G06F 8/20* | (2018.01) |
| *G06Q 10/10* | (2012.01) |

(52) U.S. Cl.
CPC ............ *G06F 8/70* (2013.01); *G06F 8/20* (2013.01); *G06Q 10/06* (2013.01); *G06Q 10/06311* (2013.01); *G06Q 10/101* (2013.01); *G06Q 10/103* (2013.01)

(58) Field of Classification Search
CPC .. G06F 8/70; G06F 8/20; G06Q 10/06; G06Q 10/06311; G06Q 10/101; G06Q 10/103

USPC ......................................................... 717/717
See application file for complete search history.

(56) References Cited

U.S. PATENT DOCUMENTS

| | | | | |
|---|---|---|---|---|
| 2002/0016954 | A1* | 2/2002 | Charisius | G06F 8/20 717/106 |
| 2003/0184595 | A1* | 10/2003 | Kodosky | G05B 19/0426 715/810 |
| 2005/0188349 | A1* | 8/2005 | Bent | G06F 8/38 717/106 |
| 2007/0294341 | A1* | 12/2007 | Shah | G06F 9/44505 709/203 |
| 2008/0120129 | A1* | 5/2008 | Seubert | G06Q 10/06 705/35 |
| 2012/0167049 | A1* | 6/2012 | Lahman | G06F 9/44 717/123 |

(Continued)

*Primary Examiner* — Chameli Das
(74) *Attorney, Agent, or Firm* — Sterne, Kessler, Goldstein & Fox P.L.L.C.

(57) ABSTRACT

Disclosed herein are system, method, and computer program product embodiments for an interactive software development kit documentation tool. An embodiment operates by receiving a component selection of an interface component in a development tool associated with a development environment. A display of the interface component and one or more configurable parameters of the interface component is generated, from which a modification to the one or more configurable parameters is received. A modified display of the interface component including a visual indication of the received modification of the one or more configurable parameter is generated in real-time. Code corresponding the modified display of the interface component is generated for use in the development environment.

20 Claims, 9 Drawing Sheets

(56) References Cited

U.S. PATENT DOCUMENTS

| | | | |
|---|---|---|---|
| 2014/0331155 A1* | 11/2014 | Liensberger | G06F 17/3089 |
| | | | 715/765 |
| 2015/0134707 A1* | 5/2015 | Doherty | G06F 3/048 |
| | | | 707/806 |
| 2016/0171090 A1* | 6/2016 | Schwartz | G06Q 10/101 |
| | | | 707/730 |
| 2016/0188663 A1* | 6/2016 | Tsumura | G06F 17/30536 |
| | | | 715/771 |
| 2016/0292715 A1* | 10/2016 | Kang | G06Q 30/0244 |
| 2016/0299745 A1* | 10/2016 | Zhang | G06F 9/45529 |
| 2017/0272316 A1* | 9/2017 | Johnson | H04L 41/28 |
| 2017/0308376 A1* | 10/2017 | Barsness | G06F 8/41 |

\* cited by examiner

INTERACTIVE SOFTWARE DEVELOPMENT KIT DOCUMENTATION TOOL

CROSS REFERENCE TO RELATED APPLICATIONS

This application claims the benefit of provisional U.S. Patent Application No. 62/462,065, by Richstein, et al., "Interactive Software Development Kit Documentation Tool," filed Feb. 22, 2017 which is hereby incorporated by reference in its entirety.

BACKGROUND

Using a standard software development kit (SDK) to write applications in certain closed development environments can be tedious work. This type of application development often requires developers to: be familiar with the ins and outs of the programming languages, read through large quantities of documentation to understand what features to use, and repeatedly debug and compile their code to test it until they achieve what they want. This process wastes valuable computing resources, developer and computing time, and has numerous opportunities for human error.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing an interactive software development kit (SDK) documentation tool.

Figure 1:
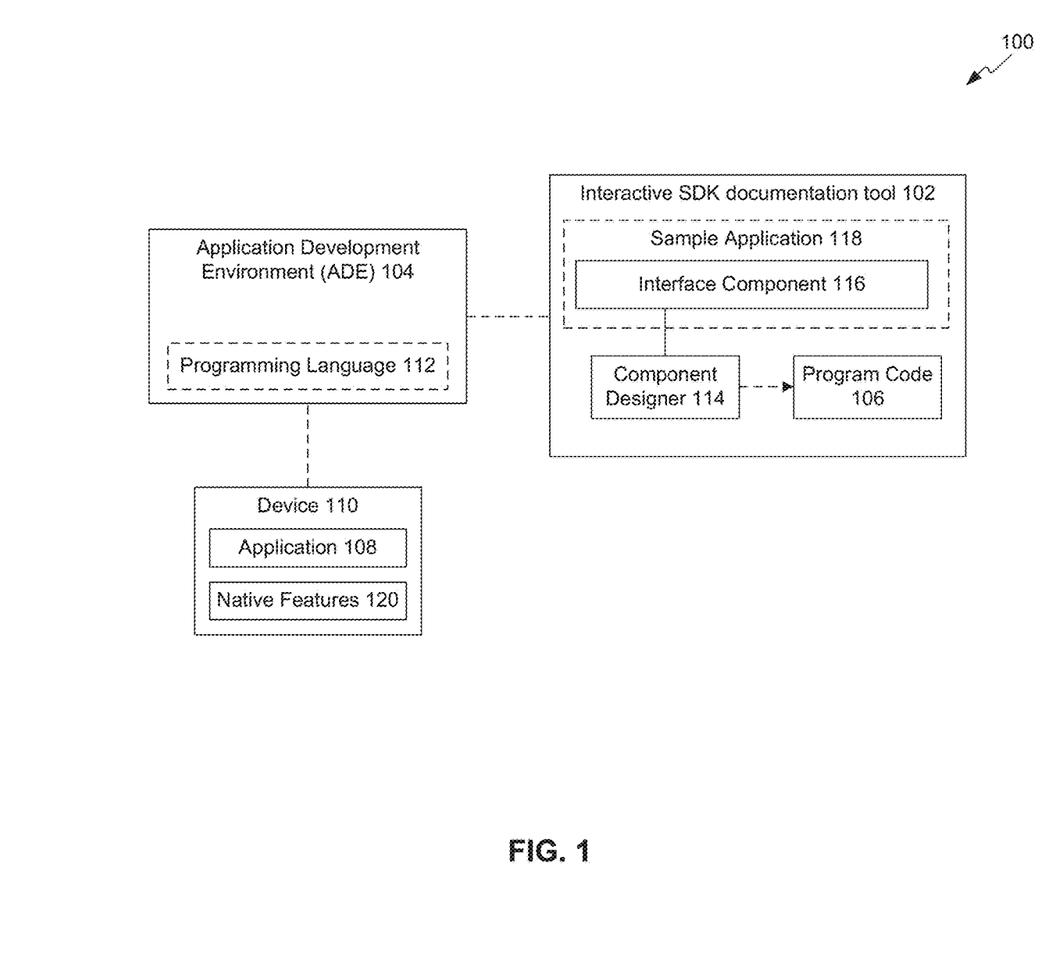
FIG. 1 illustrates example operations of an interactive software development kit (SDK) documentation tool, according to some embodiments.

FIG. 1 is a block diagram 100 of an example interactive software development kit (SDK) documentation tool 102, according to some embodiments. In an embodiment, interactive SDK documentation tool 102 may be a compliment to or a separate tool to be used in conjunction with an application development environment (ADE) 104. For example, program code 106 developed in or by interactive SDK documentation tool 102 may be usable in or transferable to ADE 104. Program code 106 may then be compiled by ADE 104 and executed as part of an application 108 across one or more devices 110.

ADE 104 may be an integrated development environment which may be used to develop, compile, and launch an application 108. ADE 104 may include a suite of software development tools which may be used to develop native code for a particular suite of devices 110 that may be operating a particular operating system or other platform. In an embodiment, ADE 104 may be Xcode® by Apple, Inc. which may be used to develop programs, applications, and apps for devices that use the iOS® operating system. Example devices include mobile phones, laptops, televisions, or other computing devices or components (including components which may be built into a vehicle, such as a car).

In an embodiment, ADE 104 may support source code for various programming languages 112. Example programming languages include, but are not limited to: C, C++, Objective-C, Objective-C++, Java®, AppleScript, Python®, Ruby®, ResEdit (Rez), Swift, GNU Pascal®, Free Pascal, Ada®, C#, Perl®, and D.

Developing a program in ADE 104 may require a developer to manually type or program the code that the developer into ADE 104, debug and compile the code, and then execute and test the code. This may be a repetitive, iterative, and time and resource consuming process with numerous opportunities for error. For example, each time the user or developer makes a change to a component of application 108 or program code, the developer must rerun the sequence to test the component and make sure there were no errors in the change. This wastes valuable computing cycles in debugging, compilation, and execution of the same code over and over again, and wastes the developer's time, particularly if the developer is creating a standard interface component for application 108. It also introduces numerous places for developer error, and inefficient or inconsistent code amongst several applications 108, particularly when designing standard user interface components.

To program or write code in a particular programming language 112, the developer must be familiar with the programming constructs or SDK corresponding to the programming language 112. If the developer wants to use a particular programming function, the developer may need to locate a corresponding software development guide or SDK (e.g., pages of documentation describing the different functions, tools, and libraries available in a particular programming language 112) to determine what function to use and how to use it. This can be boring and tedious work, with numerous opportunities for user error when writing new code. In addition, valuable computing cycles and time may be wasted in debugging, compiling, executing, and testing code for relatively standard components (such as GUI interfaces with standard menus and buttons).

According to some embodiments, interactive SDK documentation tool 102 provides a less time and resource consuming (developer and computing cycles), more efficient alternative to the standard programming model within ADE 104 with fewer opportunities for developer error. Interactive SDK documentation tool 102 reduces the time, learning curve, and computing cycles necessary to develop code for applications 108 (particularly applications 108 associated with ADE). For example, rather than a developer writing each line of code for a particular function into ADE 104, debugging, compiling, and testing it, interactive SDK documentation tool 102 may generate program code 106 that may be used in ADE 104 in a plug-and-play, what you see is what you get manner. The generated program code 106 may then be transferred from interactive SDK documentation tool 102 into ADE 104 for use by developer in application 108.

Interactive SDK documentation tool 102 may enable a visual or graphical user interface (GUI) based development of program modules or components to be used in application 108. Interactive SDK documentation tool 102 may include a number of preconfigured interface components 116 from which the developer may choose. Interactive SDK documentation tool 102 may then enable the developer to customize the style, arrangement, and features of the selected interface component(s) 116 without coding (and thus without wasting computing cycles on debugging and compiling and testing the code), and may generate the corresponding program code 106 for the developer. The developer may then copy and paste, or otherwise transfer program code 106 from interactive SDK documentation tool 102 to ADE 104.

A component designer 114 may enable a developer to visually (e.g., via drag-and-drop) design various interface components 116 to be used in application 108. Component designer 114 may enable a developer to select any number of preconfigured interface components 116 to be used in application 108, and customize or modify the interface component 116 for use in application 108. Based on the selected options and configurations by developer (such as shape, design, color, and associated functionality), component designer 114 may generate the corresponding code 106 for the exact interface component 116 designed by the developer. The generated code 106 may have been previously written and debugged, and thus the developer is able to use the code in a plug and play manner in their own application code on ADE 104.

Figure 2:
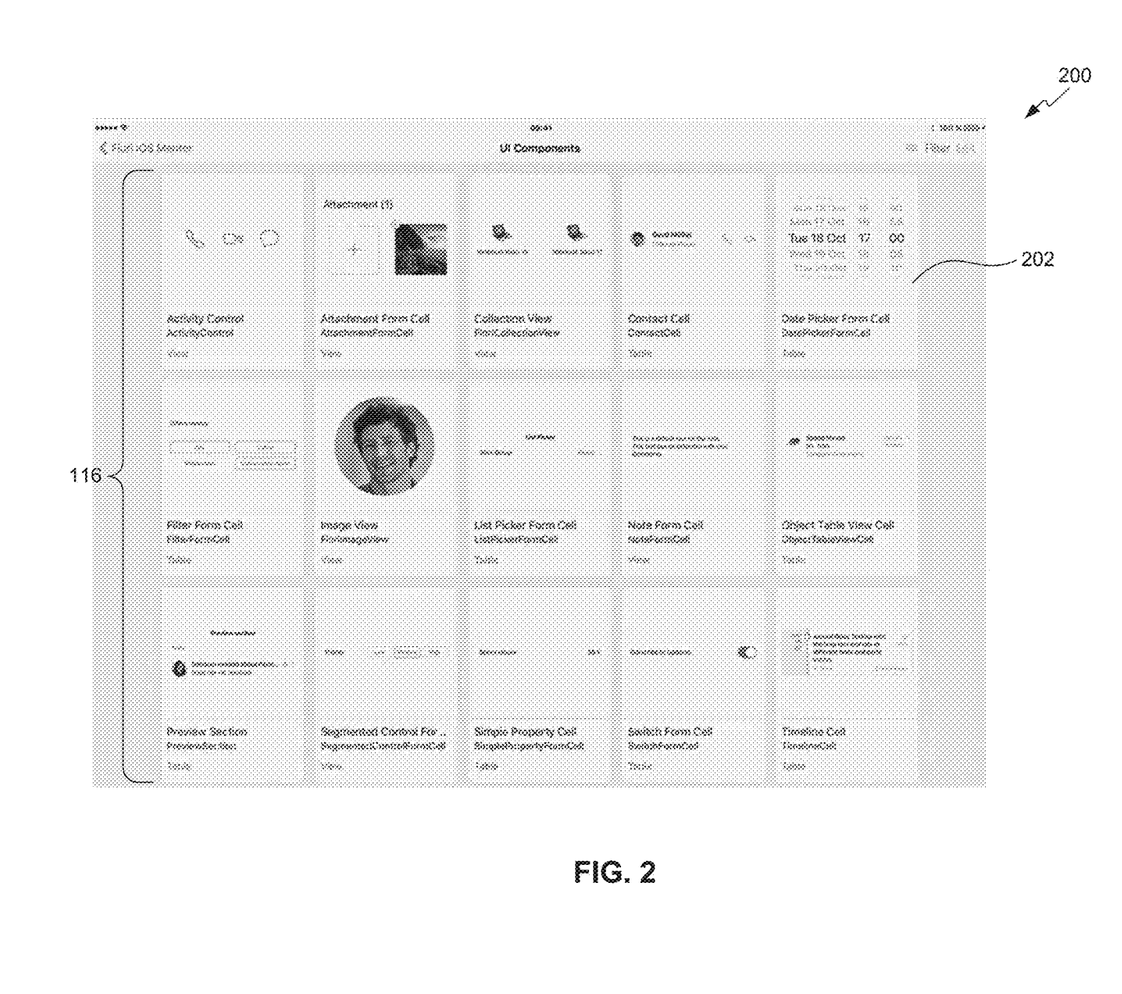
FIG. 2 illustrates example interface components which can be selected and customized using interactive SDK documentation tool, according to some embodiments.

FIG. 2 illustrates an example interface 200 displaying interface components 116 which can be selected and customized using interactive SDK documentation tool 102, according to some embodiments. For example, the date picker component 202 may enable a developer to include a feature that allows the user to pick a time and/or date. This may be useful to allow the user to set an alarm, reminder, schedule a task, or note a deadline by which a particular action needs to be taken. The developer may configure, choose, or program specific functionality for this component. The scrolling interface (as shown) is one possible style for the date picker 202. However, component designer 114 may enable the user to select a calendar selection tool to achieve the same function as well (e.g., in which the user can select a particular date on a calendar, rather than using a scroll feature).

As noted above, the example interface components 116 shown may be modified, configured, customized, or personalized to fit the particular needs, usability, and design aesthetic of a particular application 108. This may include changing the appearance of the function, colors, fonts, layouts, selection of various parameters, etc. In an embodiment, anything that may be available to be programmed with regard to the functionality to display of a particular interface component 116 may be selectable or configurable using component designer 114. In an embodiment, a developer may append or bind specifically programmed functionality or existing data (e.g., from a database) to any selected interface component 116 (within interactive SDK documentation tool 102, or may modify program code 106 after transfer to ADE 104).

Figure 3A:
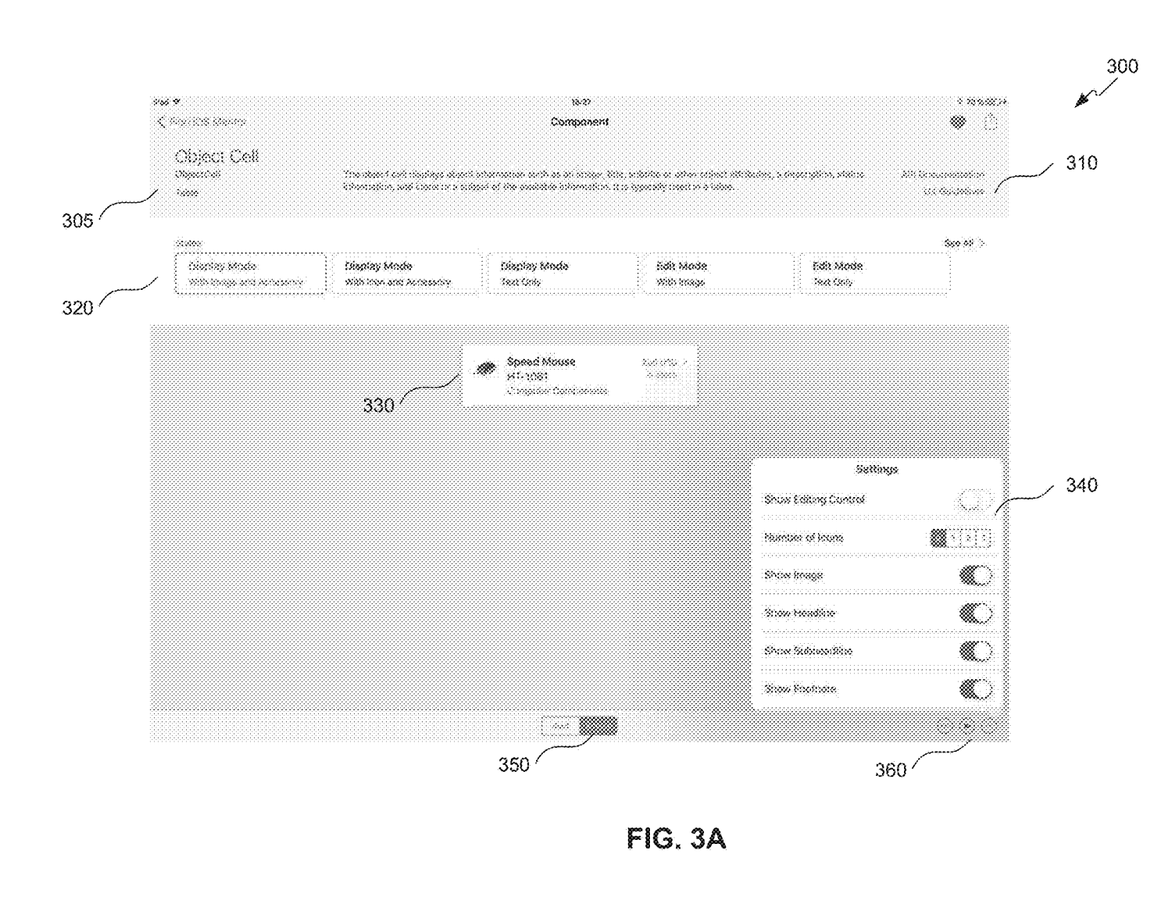
FIGS. 3A-3B illustrate example operations of an interactive SDK documentation tool, according to some embodiments.
Figure 3B:
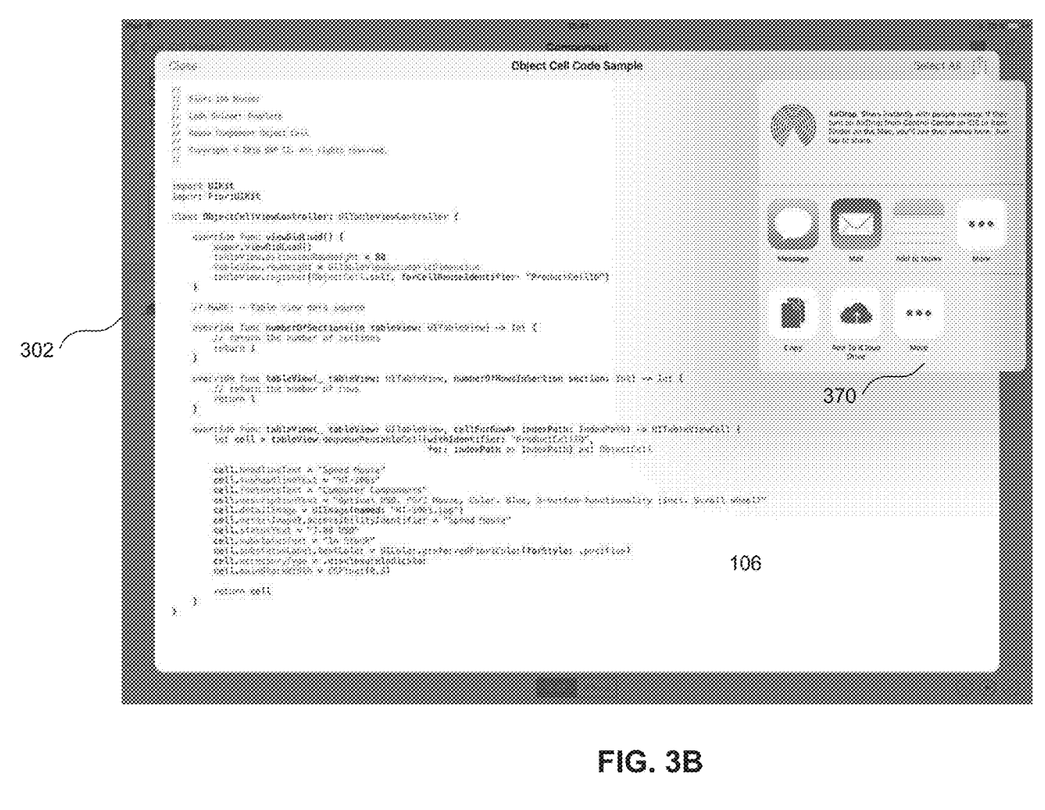

FIGS. 3A-3B illustrate example operations of the interactive SDK, according to some embodiments. More particularly, FIG. 3A illustrate example operations related to the customization of user interface component 116, and FIG. 3B illustrates example operations related to the generation (for sharing or distribution) of program code 106. The program code 106 of FIG. 3B illustrates example code generated based on the options selected in FIG. 3A As shown in FIG. 3A, interface 300 may include a description section 305. Description section 305 may include a description of which interface component 116 has been selected and is being customized. Description 305 may include a description of the different customizable sections and the function or purpose of the selected component 116, and any other relevant information. In the example shown, an object cell interface component (e.g., an example component 116) may be modified.

Section 310 of interface 300 may enable a developer to access application programming interface (API) documentation and/or user interface (UX) guidelines. Section 310 may include links or access to various documentation related to the use, design, and functionality of the selected user interface component 116 such as a written SDK or tutorials. In an embodiment, section 310 may include links to example programs or applications (e.g., 118) in which the selected component has been implemented. For example, a user or developer who desires to view the API documentation or UX guidelines may select the respective link and the document may appear in a split screen next to interface 300 or in a new window.

In section 320, interactive SDK documentation tool 102 enables a developer to select any one of several different display modes or styles. The style that is selected in the example 320 shown may include an image and an accessory attribute or metadata. The image or icon may be an image (such as a .jpg or .gif file, or a short video) specific to the product shown. Other possible styles for this particular interface component 116 may include an icon instead of an image. An icon may be a stock or other image that may be used for different products or contexts, such as the name of a manufacturer, or symbol representing a computer, etc. Another option may be text only.

In an embodiment, a developer may choose between "display mode" and "edit mode." In display mode, an end user may select the object cell, but may not modify its contents or display. Display mode may enable a developer to see how an end user is able to interact with and test the functionality of a configured component. However, in edit mode, the end user may not only select the object cell, but also edit information related to the object or data displayed, including whether or not the user wants the object to be displayed.

Section 330 shows a preview of what the interface component 116 would look like in application 108 with the indicated parameters or settings of section 340. In an embodiment, a user may toggle, select/deselect, or modify various settings 340 which may have an impact on the visual display of the interface component as shown in 330.

In an embodiment, component designer 114 may account for or include various possible visual modifications that may be made to the displayed component. As such, a developer may toggle and change different visual display options of the selected component, and immediately (in real-time) see the changes reflected in section 330 without debugging or recompiling any code. For example, settings 340 currently show that subheadline "HT-1061" is selected, however if the user toggled this selection, then 330 may be immediately updated to reflect this change. This process may be performed entirely in interactive SDK documentation tool 102 without the generation of program code 106 or transfer to ADE 104. In an embodiment, interactive SDK documentation tool 102 may include pre-compiled code for the various selections or modifications made available to the user. Then, for example, when a user makes a particular selection, the precompiled code corresponding to the selection may be executed and displayed (without re-compiling the code).

Section 350 enables a developer to see how the interface component 116 would look (in section 330) on various devices 110. In the example shown, the devices listed are the iPhone® and iPad®, however these are only exemplary and other embodiments may include other devices (including devices operating on various other non iOS® platforms).

As just noted, interactive SDK documentation tool 102 may have already accounted for the various display features and elements possible for selected components 116 in an application 108, and may enable a developer to modify those components within the acceptable framework for ADE 104. This code may have been previously written, compiled, and tested. The display may have also been configured across various devices or platforms (e.g., as shown in 350). As a result valuable computing cycles and time may be saved because no further compilation or debugging may be necessary on the part of developer (during development in interactive SDK documentation tool 102). In an embodiment, however, compilation of the program code 106 may still be performed in ADE 104 prior to execution of the related application, app, or program 108.

When the developer has confirmed that the interface element shown in 330 has the appropriate selections, look, feel, and design aesthetic the developer wants for application 108, the developer may select a generate button as shown in section 360. The generate button may cause interactive SDK documentation tool 102 to generate code corresponding to the interface icon shown in section 330.

FIG. 3B illustrates an example interface 302 displaying code generated by interactive SDK documentation tool 102. Interface 302 may include program code 106 and a share section 370. Program code 106 may include the generated code in one or more of the programming languages 112 compatible with ADE 104. Program code 106 may have been previously error checked, and tested such that it is known to be compatible with ADE 104. Interactive SDK documentation tool 102 may enable program code 106 to be used by a developer in creating a program, app, or application 108 in ADE 104.

In an embodiment, ADE 102 may be a closed development environment (such as Xcode®) that does not allow third-party tools from accessing the ADE interface or environment directly. As such, to use program code 106, the developer may need a way to transfer or share the code between interactive SDK documentation tool 102 and ADE 104. Interactive SDK documentation tool 102 provides the developer an easy way to transfer program code 106 between interactive SDK documentation tool 102 environment and ADE 104 in section 370. There are various modes of transfer or sharing between interactive SDK documentation tool 102 and ADE 104 environments. Example manners of transfer include AirDrop®, text message, e-mail, copying to a notepad, copy and paste, adding it to iCloud® and others.

In an embodiment, interactive SDK documentation tool 102 may track changes to an SDK, and update components 116 and code 106 accordingly. For example, if application 108 has been written using code generated by interactive SDK documentation tool 102, then interactive SDK documentation tool 102 may alert a developer when a corresponding SDK has been updated such that the code 106 of application 108 needs to be updated. This may enable interactive SDK documentation tool 102 to be useful for an entire lifecycle of application 108 and through changes of different SDKs associated with programming languages 112.

Returning to FIG. 1, application 108 may be an application configured to run across one or more devices 108. In an embodiment, application 108 may include an app that is made available to various devices operating a specific platform (i.e., iOS®) that may download and execute application 108. Thus, after the app 108 has been launched, the developer may request or be provided notifications as to when any of the designed components (designed within interactive SDK documentation tool 102) need to be updated (e.g., based on an identified update to the underlying SDK). As such, interactive SDK documentation tool 102 may track which developers have used interactive SDK documentation tool 102 to create which components 116, and may optionally track in which apps 108 the designed program code 106 was used. This may allow interactive SDK documentation tool 102 to provide the appropriate notification to the appropriate developer.

Further, program code 106 may make use of or include code that operates native features 120. Native features 120 may include any device-specific features that may be accessed by application 108 and used by or accounted for in program code 106. Example native features 120 include, but are not limited to, the touch screen interface, microphone, camera, other applications operating on the device, or other devices that may be connected to device 110 through one or more wired or wireless ports. These other devices may include sensors, gauges, instruments, speakers, or other devices.

In an embodiment, interactive SDK documentation tool 102 may include one or more sample applications 118 that use various or sample interface components 116 in an interactive manner. Sample applications 118 may enable a developer to see explore the 'look and feel' of various components 116 and help the developer decide which component(s) 116 are suited for application 108.

Figure 4A:
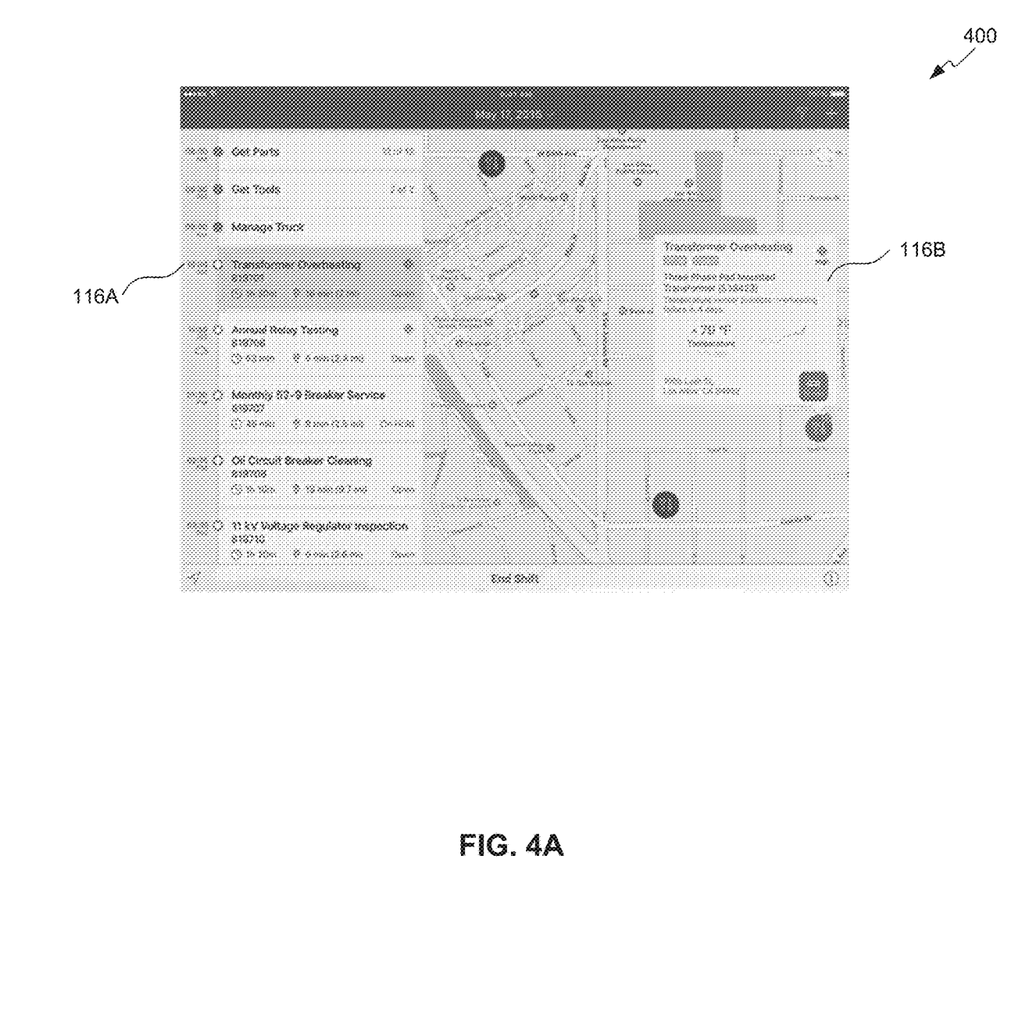
FIGS. 4A-4C illustrate example operations of an interactive SDK documentation tool, according to some embodiments.
Figure 4B:
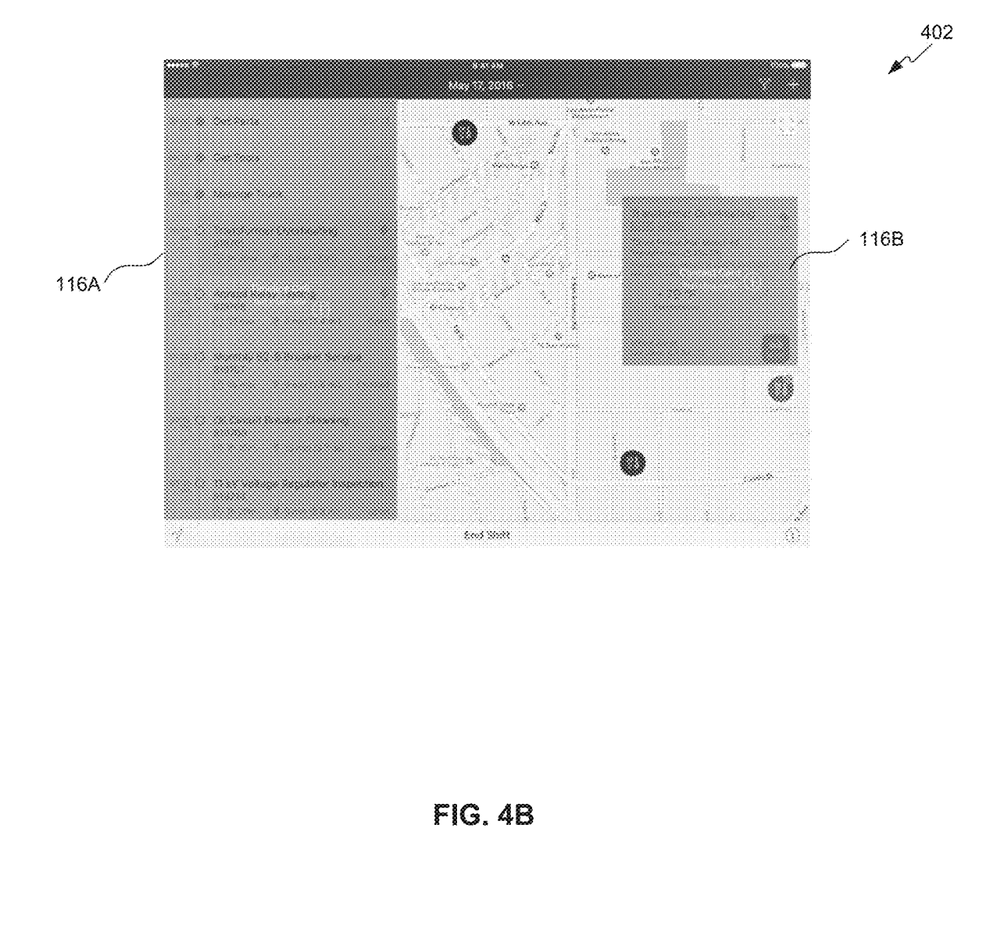
Figure 4C:
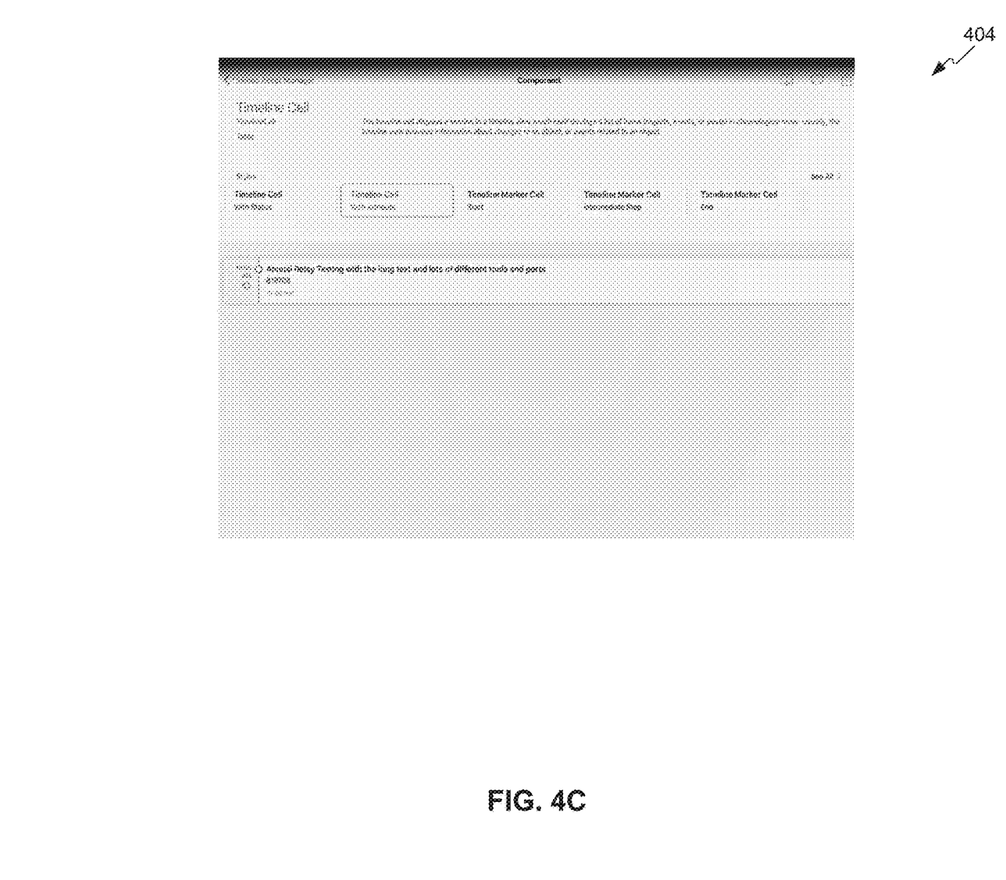

FIGS. 4A-4C illustrate example operations of the interactive SDK documentation tool 102, according to some embodiments. More particularly, FIGS. 4A-C illustrate example interfaces of how a developer may use a sample application (e.g., application 108) to select an interface component 116 to customize.

In FIG. 4A interface 400 shows a screen or interface of a sample application 108. The interface 400 includes various selectable interface components 116, that a developer may use, play around with, and select (e.g., for use in application 108). On the left side of interface 400 may be a timeline component 116A, and on the right side may be contact card component 116B.

FIG. 4B illustrates an example of interface 402 in which interactive SDK documentation tool 102 identifies the different selectable or modifiable components 116A, 116B. For example, to activate this mode, a developer may change the mode or scroll over either component 116A or 116B, and interactive SDK documentation tool 102 may provide a name of the corresponding component or the displayed components 116.

If the developer, for example, selects the timeline component 116A, component designer 114 of interactive SDK documentation tool 102 may enable the developer to customize or modify the selected timeline component 116A for use with application 108 as shown in interface 404 of FIG. 4C. Operations related to the interface 404 as shown in FIG. 4C may resemble those described above relative to FIG. 3A).

Figure 5:
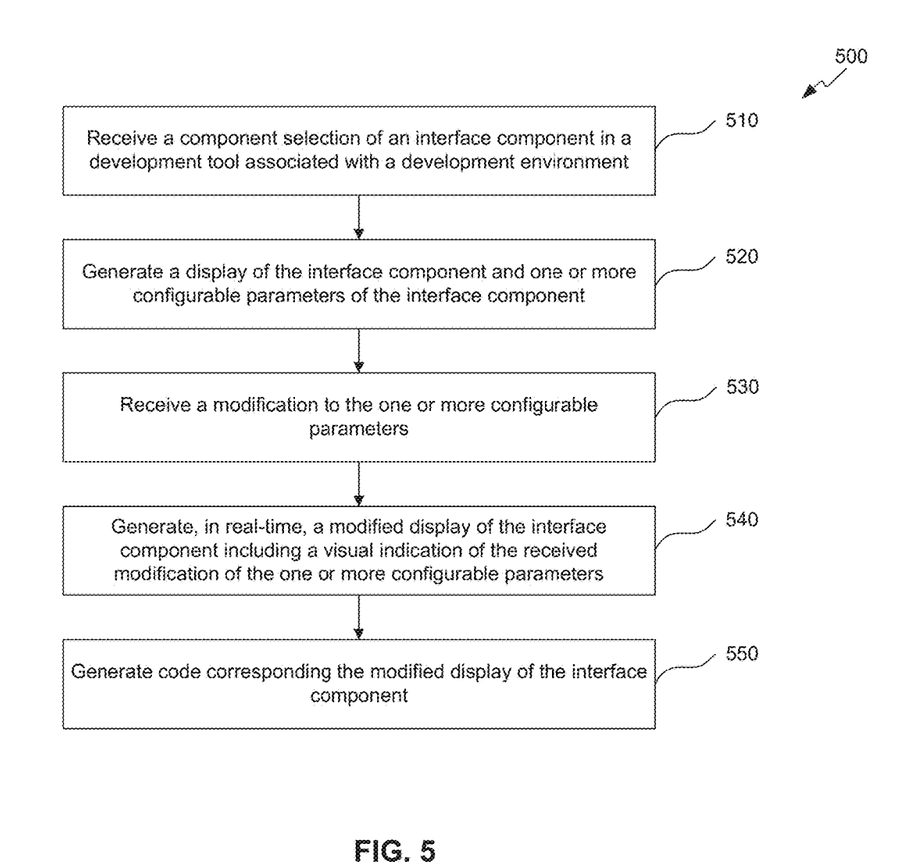
FIG. 5 is a flowchart illustrating example operations for an interactive SDK documentation tool, according to some embodiments.

FIG. 5 is a flowchart illustrating example operations for an interactive SDK documentation tool 102, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

At 510, a component selection of an interface component in a first development environment associated with a second development environment is received. For example, interactive SDK documentation tool 102 may receive a selection of interface component 116. Interface component 116 may be selected directly from component designer 114 (as shown in FIG. 2), or from one or more sample applications 118 (as shown in FIGS. 4A and 4B). Interactive SDK 104 may generate or otherwise provide pre-generated and/or pre-compiled source code 106 that may be used in ADE 104 for application 108. In an embodiment. ADE 104 may be Xcode® and may be used to generate, compile, and launch applications 108 that run on the iOS® by Apple, Inc.

At 520, a display of the interface component and one or more configurable parameters of the interface component may be generated. For example, component designer 114 may generate interfaces (FIGS. 3A and 4C) that enable a developer to modify or customize the selected interface component 116.

At 530, a modification to the one or more configurable parameters is received. For example, component designer 114 may receive selections or modifications to settings 340 for the selected interface component 116 shown in section 330.

At 540, a modified display of the interface component including a visual indication of the received modification of the one or more configurable parameters may be generated in real-time. For example, component designer 114 may enable developer to see what interface component 116 looks like in real-time when different settings 340 are configured (e.g., by executing various, corresponding pre-compiled code segments). Interactive SDK documentation tool 102 may not require a compilation (or re-compilation) of code corresponding to the component 116, as may be required if a developer was trying to code the component 116 directly in ADE 102. This saves processing cycles, time, and minimizes the chances of developer coding errors. The developer may then continue to modify the look, feel, and functionality using component designer 114 until the developer has what is appropriate for application 108.

At 550, code corresponding the modified display of the interface component may be generated. For example, interactive SDK documentation tool 102 may generate program code 106 which may then be used or is transferable to ADE 104 for use in conjunction with the developer's own code for application 108.

Figure 6:
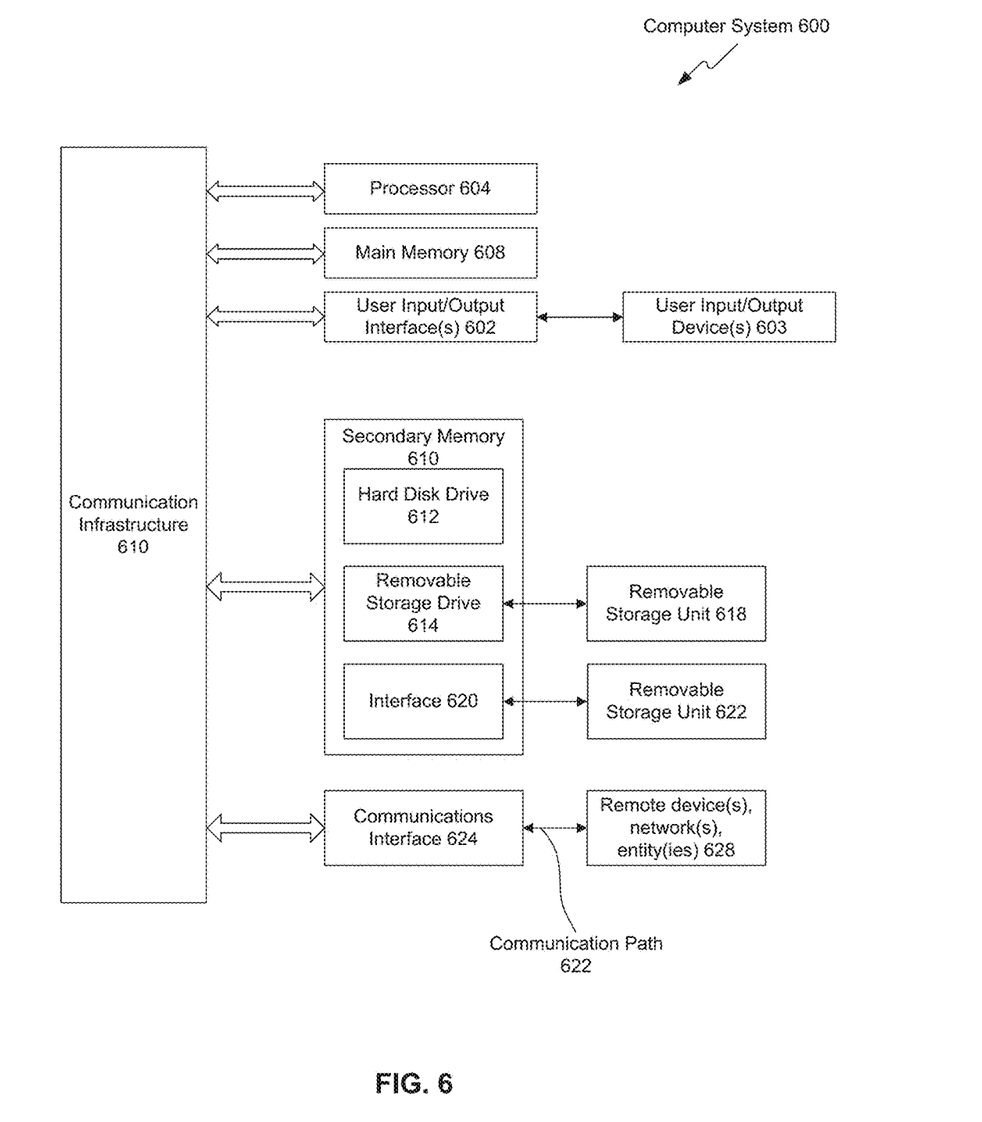
FIG. 6 is an example computer system useful for implementing various embodiments.

Various embodiments can be implemented, for example, using one or more computer systems, such as computer system 600 shown in FIG. 6. Computer system 600 can be used, for example, to implement the systems of FIGS. 1-4, and/or the method of FIG. 5. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   receiving a component selection of an interface component in a development tool associated with a development environment, wherein the development tool generates code usable to generate the interface component in an application written in the development environment;
   generating a display of the interface component and one or more configurable parameters of the interface component based on a set of pre-compiled and executable code corresponding to the interface component, wherein the executable code includes a plurality of modifications to one or more configurable parameters, and wherein the precompiled code is generated by an interactive software development kit (SDK) and is configured to be executed and displayed without recompiling the precompiled code;
   receiving at least one of the modifications to the one or more configurable parameters;
   generating, in real-time, a modified display of the interface component including a visual indication of the received at least one modification of the one or more configurable parameters based on the set of pre-compiled code and executable code corresponding to the interface component; and
   generating code corresponding the modified display of the interface component, wherein the generated code is transferable into code corresponding to the application in the development environment.

2. The method of claim 1, wherein the development environment is Xcode®.

3. The method of claim 2, wherein the generating the modified display comprises generating a preview of the interface component on one or more devices based on the pre-compiled and executable code corresponding to the interface component.

4. The method of claim 1, wherein the generated code is native to a device on which the application is designed to operate, and wherein the generated code is configured to access one or more native features of the device.

5. The method of claim 4, wherein the one or more native features comprise at least one of a microphone or a camera of the device.

6. The method of claim 4, wherein the device is a mobile device operating in an iOS® environment.

7. The method of claim 1, wherein receiving the component selection comprises:
   displaying a sample application comprising a plurality of sample interface components; and
   receiving the component selection via a selection on the sample application of one of the displayed sample interface components.

8. The method of claim 1, wherein the set of pre-compiled and executable code corresponding to the interface component includes code that is configured to display the interface component across a plurality of operating platforms, and was compiled prior to the generating the display.

9. A system, comprising:
   a memory; and
   at least one processor coupled to the memory and configured to:
      receive a component selection of an interface component in a development tool associated with a development environment, wherein the development tool generates code usable to generate the interface component in an application written in the development environment;

generate a display of the interface component and one or more configurable parameters of the interface component based on a set of pre-compiled and executable code corresponding to the interface component, wherein the executable code includes a plurality of modifications to one or more configurable parameters, and wherein the precompiled code is generated by an interactive software development kit (SDK) and is configured to be executed and displayed without recompiling the precompiled code;

receive at least one of the modifications to the one or more configurable parameters;

generate, in real-time, a modified display of the interface component including a visual indication of the received at least one modification of the one or more configurable parameters based on the set of pre-compiled code and executable code corresponding to the interface component; and generate code corresponding the modified display of the interface component, wherein the generated code is transferable into code corresponding to the application in the development environment.

10. The system of claim 9, wherein the development environment is Xcode®.

11. The system of claim 10, wherein the processor configured to generate the modified display is configured to generate a preview of the interface component on one or more devices based on the pre-compiled and executable code corresponding to the interface component.

12. The system of claim 9, wherein the generated code is native to a device on which the application is designed to operate, and wherein the generated code is configured to access one or more native features of the device.

13. The system of claim 12, wherein the one or more native features comprise at least one of a microphone or a camera of the device.

14. The system of claim 12, wherein the device is a mobile device operating in an iOS® environment.

15. The system of claim 9, wherein the processor configured to receive the component selection is configured to:
  display a sample application comprising a plurality of sample interface components; and
  receive the component selection via a selection on the sample application of one of the displayed sample interface components.

16. A non-transitory computer-readable device having instructions stored thereon that, when executed by at least one computing device, causes the at least one computing device to perform operations comprising:
  receiving a component selection of an interface component in a development tool associated with a development environment, wherein the development tool generates code usable to generate the interface component in an application written in the development environment;
  generating a display of the interface component and one or more configurable parameters of the interface component based on a set of pre-compiled and executable code corresponding to the interface component, wherein the executable code includes a plurality of modifications to one or more configurable parameters, and wherein the precompiled code is generated by an interactive software development kit (SDK) and is configured to be executed and displayed without recompiling the precompiled code;
  receiving at least one of the modifications to the one or more configurable parameters;
  generating, in real-time, a modified display of the interface component including a visual indication of the received at least one modification of the one or more configurable parameters based on the set of pre-compiled code and executable code corresponding to the interface component; and
  generating code corresponding the modified display of the interface component, wherein the generated code is transferable into code corresponding to the application in the development environment.

17. The device of claim 16, wherein the development environment is Xcode®.

18. The device of claim 17, wherein the generating the modified display comprises generating a preview of the interface component on one or more devices based on the pre-compiled and executable code corresponding to the interface component.

19. The device of claim 16, wherein the generated code is native to a device on which the application is designed to operate, and wherein the generated code is configured to access one or more native features of the device.

20. The device of claim 19, wherein the one or more native features comprise at least one of a microphone or a camera of the device.

* * * * *